(12) United States Patent
Menon et al.

(10) Patent No.: US 11,106,739 B2
(45) Date of Patent: Aug. 31, 2021

(54) DOCUMENT STRUCTURES FOR SEARCHING WITHIN AND ACROSS MESSAGES

(71) Applicant: Microsoft Technology Licensing, LLC, Redmond, WA (US)

(72) Inventors: Hari Shankar Sreekumar Menon, Sunnyvale, CA (US); Shubham Gupta, San Mateo, CA (US); Suruchi H. Shah, Mountain View, CA (US); Ali Sadiq Mohamed, San Jose, CA (US); Parinkumar D. Shah, Milpitas, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 16/369,659

(22) Filed: Mar. 29, 2019

(65) Prior Publication Data
US 2020/0311151 A1    Oct. 1, 2020

(51) Int. Cl.
*G06F 16/00*    (2019.01)
*G06F 16/903*    (2019.01)
(Continued)

(52) U.S. Cl.
CPC ...... *G06F 16/90344* (2019.01); *G06F 16/148* (2019.01); *G06F 16/22* (2019.01);
(Continued)

(58) Field of Classification Search
CPC .. G06F 16/2365; G06F 16/22; G06F 16/9535; G06F 16/951; G06F 16/24553;
(Continued)

(56) References Cited

U.S. PATENT DOCUMENTS 5,548,789 A * 8/1996 Nakanura ............... H04L 51/12
358/402
10,158,589 B2 * 12/2018 Collet ..................... H04L 51/22
(Continued)

FOREIGN PATENT DOCUMENTS

WO    WO2005013571 A1 *  2/2005
WO    WO 2009/086188 A2 *  7/2009
(Continued)

OTHER PUBLICATIONS

Shweta Khare et al., "Scalable Edge Computing for Low Latency Data Dissemination in Topic-Based Publish/Subscribe", IEEE/ACM Symposium on Edge Computing (SEC), Oct. 25-27, 2018, pp. 214-227.*
(Continued)

*Primary Examiner* — Srirama Channavajjala
(74) *Attorney, Agent, or Firm* — Schwegman Lundberg & Woessner, P.A.

(57) ABSTRACT

The disclosed embodiments provide a system for processing data. During operation, the system stores a conversation containing a series of messages exchanged among a number of participants in a first document containing metadata for the conversation; a second document containing message content for the series of messages, wherein the message content includes a fixed position gap between starting or ending positions in consecutive messages in the series of messages; and one or more additional documents storing message metadata for individual messages in the conversation. Next, the system processes a first search across the series of messages in the conversation using an index of the set of documents. The system also processes, using the index, a second search within individual messages in the series of messages as a span query with a distance that is shorter than the fixed position gap.

15 Claims, 5 Drawing Sheets

(51) Int. Cl.
  *H04L 12/58* (2006.01)
  *G06F 16/14* (2019.01)
  *G06F 16/22* (2019.01)
  *G06F 16/24* (2019.01)
  *G06F 16/38* (2019.01)
(52) U.S. Cl.
  CPC .............. *G06F 16/24* (2019.01); *G06F 16/38* (2019.01); *H04L 51/046* (2013.01); *H04L 51/22* (2013.01); *H04L 51/36* (2013.01)
(58) Field of Classification Search
  CPC .... G06F 16/93; G06F 16/90344; G06F 16/31; G06F 16/24568; G06F 16/383; G06F 16/38; G06F 16/483; G06F 16/24; G06F 16/148; G06Q 50/01; H04L 51/16; H04L 51/32; H04L 51/046; H04L 51/10; H04L 51/04; H04L 51/36; H04L 51/22
  See application file for complete search history.

(56) References Cited

U.S. PATENT DOCUMENTS

| | | | | |
|---|---|---|---|---|
| 2006/0248151 | A1* | 11/2006 | Belakovskiy | G06F 16/31 709/206 |
| 2008/0294657 | A1* | 11/2008 | Leung | G06F 16/316 |
| 2009/0158169 | A1* | 6/2009 | Arav | G06F 3/04842 715/751 |
| 2010/0011072 | A1* | 1/2010 | Mishchenko | G06Q 10/10 709/206 |
| 2010/0293242 | A1* | 11/2010 | Buchheit | H04L 51/16 709/206 |
| 2011/0016123 | A1* | 1/2011 | Pandey | G06F 16/2308 707/737 |
| 2012/0272160 | A1* | 10/2012 | Spivack | H04L 51/32 715/752 |
| 2014/0089280 | A1* | 3/2014 | Palay | G06F 16/31 707/696 |
| 2015/0142816 | A1* | 5/2015 | Rajamanickam | G06F 16/22 707/741 |
| 2015/0363215 | A1* | 12/2015 | Versteeg | G06F 11/3684 703/23 |
| 2016/0261727 | A1* | 9/2016 | Yang | H04L 65/4069 |
| 2017/0272516 | A1* | 9/2017 | Deakin | H04L 47/622 |
| 2017/0339087 | A1* | 11/2017 | Jeon | H04L 51/16 |
| 2018/0095957 | A1* | 4/2018 | Mishne | G06F 16/93 |
| 2018/0260782 | A1* | 9/2018 | Bay | H04L 51/36 |

FOREIGN PATENT DOCUMENTS

| | | | |
|---|---|---|---|
| WO | WO2013016047 A2 | * | 1/2013 |
| WO | WO2016010932 | * | 1/2016 |
| WO | WO2019206041 | * | 10/2019 |

OTHER PUBLICATIONS

Rishika Shree, et al.,"KAFKA: The modern platform for data management and analysis in big data domain", 2nd International Conference on Telecommunication and Networks (TEL-NET), Aug. 10-11, 2017, pp. 1-5.*

Junze Wang et al., "Message Receiver Determination in Multiple, Simultaneous IM Conversations", IEEE Intelligent Systems , May/Jun. 2011 pp. 4-31.*

"Block Join Parent Query Across Children Docs", Retrieved From: https://web.archive.org/web/20150503083121/http://lucene.472066.n3.nabble.com:80/Block-Join-Parent-Query-across-children-docs-td4127637.html, May 3, 2015, 10 Pages.

"Package org.Apache.Lucene.Search.Join", Retrieved From: https://lucene.apache.orgicore/7_3_0/join/org/apache/lucene/search/join/package-summary.html, Retrieved Date: Feb. 11, 2019, 2 Pages.

Ingersoll, Grant, "Getting Started With Payloads", Retrieved From: https://lucidworks.com/post/getting-started-with-payloads/, Retrieved Date: Feb. 11, 2019, 9 Pages.

Miller, Mark, "What Is the SpanQuery?", Retrieved From: https://lucidworks.com/post/the-spanquery/, Retrieved Date: Feb. 11, 2019, 5 Pages.

Savrasov, et al. , "Faceting with Lucene Block Join Query", Retrieved From: https://www.slideshare.net/lucidworks/faceting-with-lucene-block-join-query-oleg-savrasov, Nov. 19, 2014, 15 Pages.

* cited by examiner

DOCUMENT STRUCTURES FOR SEARCHING WITHIN AND ACROSS MESSAGES

BACKGROUND

Field

The disclosed embodiments relate to techniques for searching content in messages and conversations. More specifically, the disclosed embodiments relate to document structures for searching within and across messages.

Related Art

Email clients, newsgroups, bulletin board systems, forums, and/or messaging platforms commonly group messages and replies exchanged among multiple participants under conversations or threads. Within a given conversation, messages may be shown in chronological order to allow readers to follow the structure and/or flow of the conversation. The messages may also be filtered by attributes such as author, date or time of creation, read/unread status, and/or content.

On the other hand, grouping or nesting of messages under conversations may result in difficulties in supporting search both within individual messages and across messages in the same conversation. For example, indexing of messages that are stored in separate documents may allow search terms to be matched to the content of each message but prevents search terms from being matched to content across messages in the same conversation. Conversely, indexing of documents that store entire conversations may enable searching across messages in the conversations but may interfere with identifying individual messages in the conversations that contain content matching search terms.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The disclosed embodiments provide a method, apparatus, and system for searching within and across messages that are grouped under conversations. In these embodiments, a conversation includes a series of messages and/or replies that are transmitted among multiple participants and/or grouped under a common title and/or one or more labels. For example, a conversation can include an email thread, a series of chats exchanged in a group or channel, and/or a string of responses and/or comments to a post, article, and/or other content.

More specifically, the disclosed embodiments provide a method, apparatus, and system for processing searches of messages grouped under conversations using a document structure related to the messages and/or conversations. The document structure includes a first document storing metadata for a given conversation, a second document storing message content for all messages in the conversation, and additional documents storing message metadata for individual messages (e.g., separate documents storing message metadata for different messages).

When a search is received from a user of a messaging platform, or prior to receiving a search request, conversations in which the user is involved and/or otherwise has access to are indexed according to the document structure above. To perform the search across messages in individual conversations, the index is queried for documents containing one or more tokens submitted in the search. For example, a search for conversations that contain two words is processed by retrieving a first set of documents to which the first word is mapped in an inverted index of the participant's conversations, retrieving a second set of documents to which the second word is mapped in the inverted index, and generating search results of the search as the intersection of the two sets of documents.

To allow searching of content within individual messages, the message content is stored with a fixed position gap between consecutive messages in the second document. In one embodiment, the fixed position gap is selected to be at least double the maximum message length of the messages. For example, the position gap is set to 16,000 virtual offsets between the beginnings of consecutive messages in the second document when the messages have a maximum message length of 8,000 tokens. A span query with a distance that is set to the maximum message length can then be executed to find individual messages that match the search term.

By storing and indexing conversation metadata and message metadata for each message in a conversation in separate documents, the disclosed embodiments allow conversation-specific metadata (e.g., title, participants, labels, etc.) and message-specific metadata (e.g., author, timestamp, etc.) to be separately searched and/or filtered. At the same time, the storing of all message content in the conversation with fixed position gaps in a single document allows for searching on both the message level and conversation level within a space-efficient layout.

On the other hand, conventional techniques store tokens in message content with identifiers of members, messages, and/or other attributes associated with the message content, which consumes significantly more storage than the document structure used by the disclosed embodiments. Executing searches of messages and/or conversations stored using conventional techniques additionally requires matching of search terms to individual tokens and subsequently filtering the tokens by the corresponding identifiers, which may be slow and/or inefficient compared with searching of message content using position offsets within the same document.

Consequently, the disclosed embodiments provide technological improvements related to the development and use of computer systems, applications, services, user experiences, tools, and/or workflows related to data storage, data indexing, search, and/or messaging.

Document Structures for Searching within and Across Messages

Figure 1:
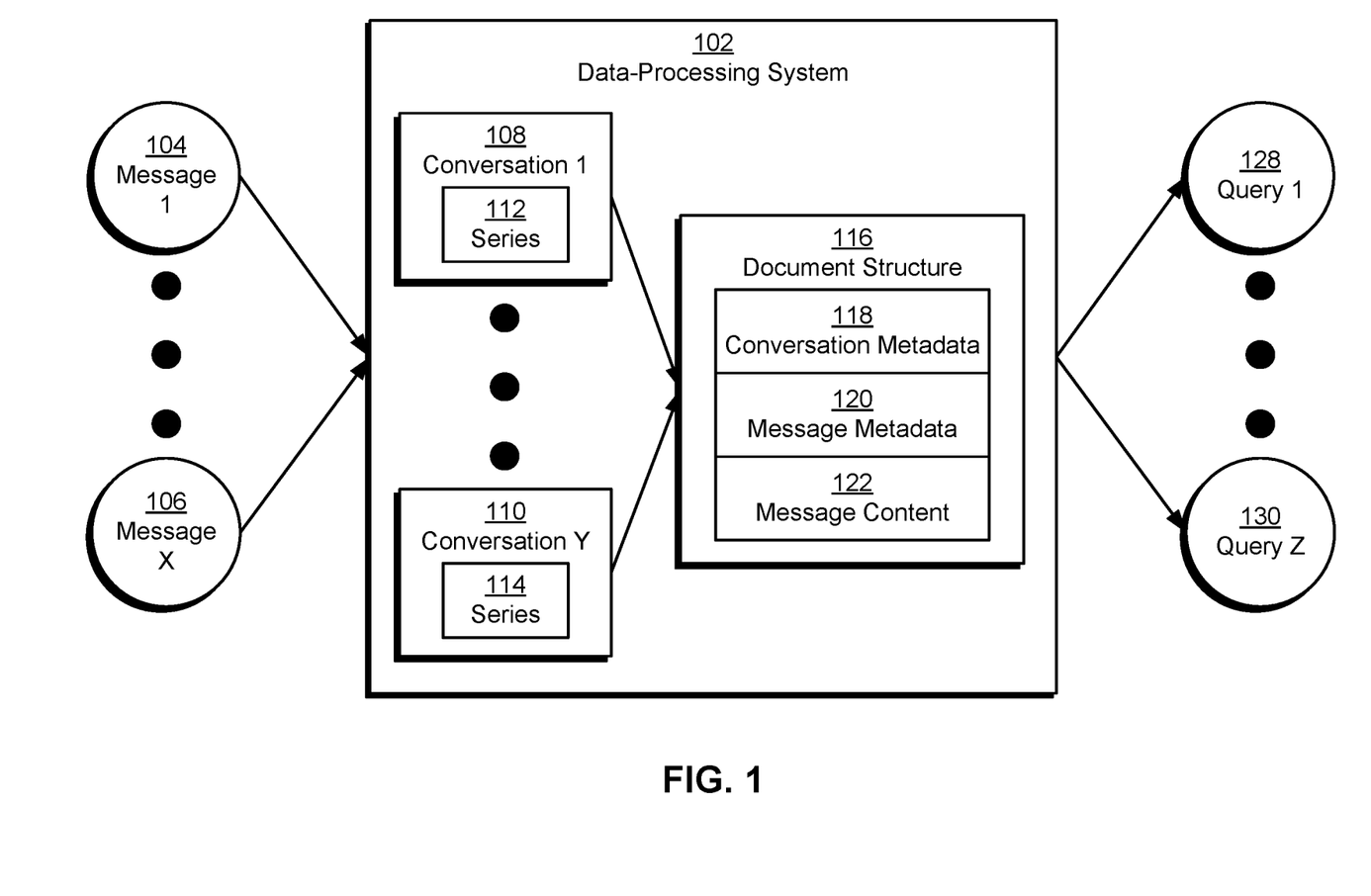
FIG. 1 shows a schematic of a system in accordance with the disclosed embodiments.

FIG. 1 shows a schematic of a system in accordance with the disclosed embodiments. As shown in FIG. 1, the system includes a data-processing system 102 that organizes and/or stores messages (e.g., message 1 104, message x 106) exchanged between or among a number of users. In one embodiment, data-processing system 102 forms a part of and/or execute in conjunction with an email client, chat service, messaging platform, newsgroup, bulletin board system, forum, and/or another mechanism for exchanging digital messages among users.

In one or more embodiments, data-processing system 102 organizes and/or stores messages generated by the users by grouping messages that share certain attributes under conversations (e.g., conversation 1 108, conversation y 110). In one embodiment, data-processing system 102 defines a conversation as a series (e.g., series 112-114) of messages exchanged between or among two or more participants. Data-processing system 102 optionally defines each conversation based on a conversation title, group name, time period spanning messages in the conversation (e.g., a certain number of days, weeks, months, etc. over which the messages were transmitted), one or more labels (e.g., tags and/or folders under which messages can be organized), keywords and/or other content in the messages, and/or other attributes related to messages received by data-processing system 102. Thus, a conversation can include an email thread, a series of chats exchanged within a group or channel, and/or a string of responses and/or comments to a post, article, and/or other content.

More specifically, data-processing system 102 uses a document structure 116 to store data related to messages and conversations under which the messages are grouped. Document structure 116 includes conversation metadata 118, message metadata 120, and message content 122. Conversation metadata 118 includes attributes that define and/or pertain to conversations, such as (but not limited to) a unique conversation identifier, title, list of participants, and/or one or more labels for each conversation.

Message metadata 120 includes attributes that define and/or pertain to individual messages. In one embodiment, message metadata 120 includes a unique message identifier, author, and/or timestamp of creation or transmission for each message. Message metadata 120 optionally includes conversation identifiers for one or more conversations in which a given message is included.

Message content 122 includes text and/or other data transmitted between or among participants in a given conversation. In one embodiment, message content 122 includes text in chat messages, Short Message Service (SMS) messages, emails, and/or other types of text-based communications supported by digital messaging or communication platforms. Message content 122 also, or instead, includes images, audio, video, documents, executable files, attachments, and/or other types of content transmitted or shared using the platforms.

In one or more embodiments, data-processing system 102 uses an index created from documents in document structure 116 to process queries (e.g., query 1 128, query z 130) of data associated with messages and/or conversations. For example, data-processing system 102 creates an inverted index of documents in document structure 116 and use the inverted index to perform searching, filtering, and/or other types of querying of data and/or metadata related to the messages and/or conversations. As described in further detail below, the documents store conversations in a way that reduces consumption of storage resources and allows efficient querying, searching, and/or filtering of fields in conversation metadata 118, fields in message metadata 120, within message content 122 in individual messages, and/or across message content 122 of messages within conversations.

Figure 2:
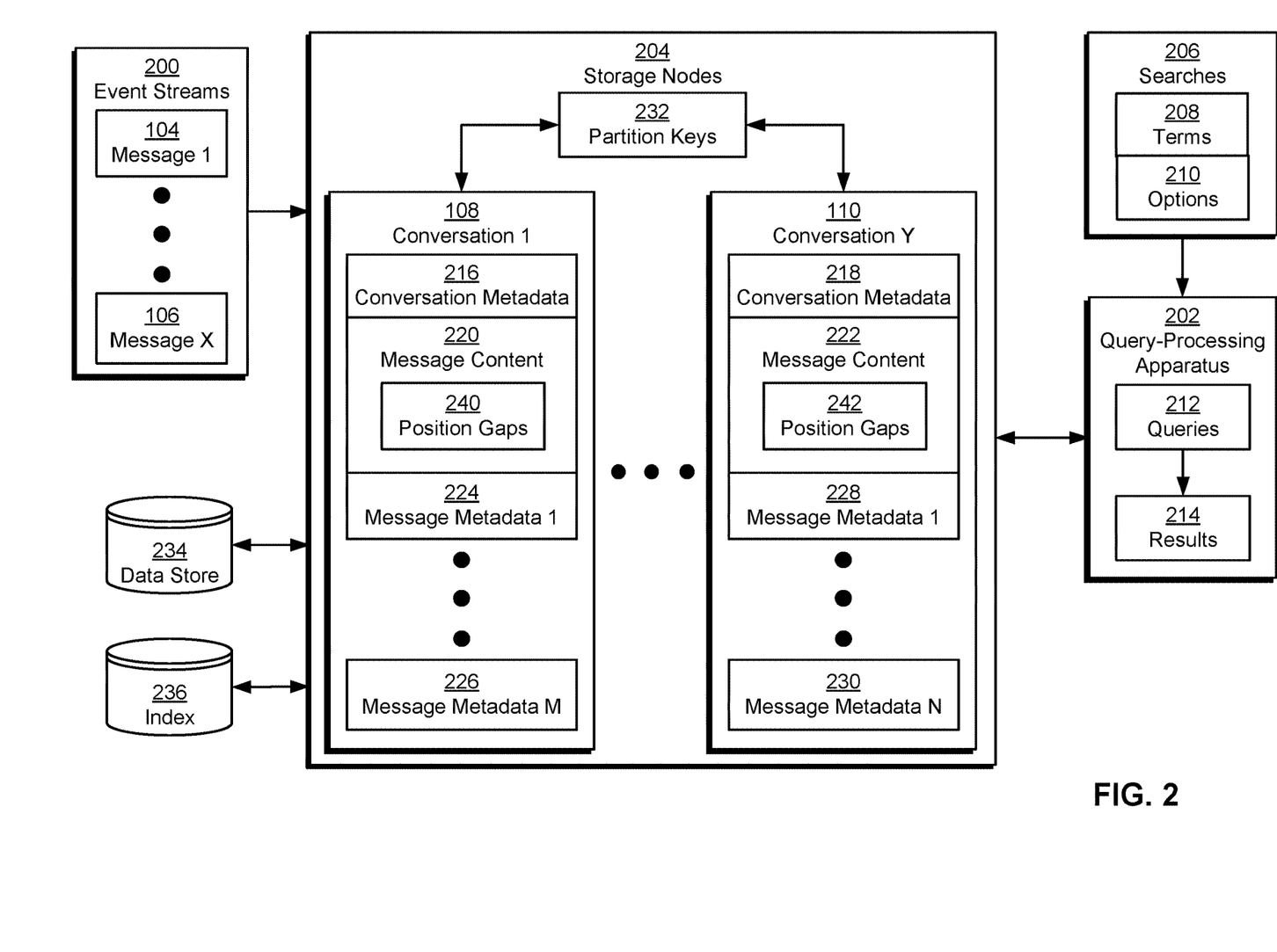
FIG. 2 shows a system for processing data in accordance with the disclosed embodiments.

FIG. 2 shows a system for processing data (e.g., data-processing system 102 of FIG. 1) in accordance with the disclosed embodiments. As shown in FIG. 2, the system includes a query-processing apparatus 202 and a number of storage nodes 204 that provide a data store 234 and an index 236 of data in data store 234. Each of these components is described in further detail below.

Storage nodes 204 store and/or index different subsets of data and/or metadata related to messages and conversations exchanged among users of a messaging platform (e.g., email client, chat service, SMS service, newsgroup, forum, commenting system, etc.). For example, each storage node includes a physical and/or virtual node or partition that stores messages (e.g., message 1 104, message x 106) and/or conversations (e.g., conversation 1 108, conversation y 110) for a subset of users in the platform within an instance of data store 234. To enable efficient querying of data and/or metadata in data store 234, each storage node further include an instance of index 236 (e.g., an inverted index) that maps content in the data and/or metadata to documents in which the data and/or metadata are found.

In one or more embodiments, data store 234 and/or index 236 are updated using records of recent activity received over one or more event streams 200. For example, event streams 200 are generated and/or maintained using a distributed streaming platform such as Apache Kafka (Kafka™ is a registered trademark of the Apache Software Foundation). One or more event streams 200 are also, or instead, provided by a change data capture (CDC) pipeline that propagates changes to messages and/or conversations from a source of truth for the messages and/or conversations. In some embodiments, events containing records of new messages, message updates, message deletions, message views, new conversations, deleted conversations, and/or other activity related to use of a messaging platform are generated in response to the activity. The records are then propagated to storage nodes 204 and/or other components subscribing to event streams 200 on a nearline basis.

More specifically, each storage node updates a local instance of data store 234 and index 236 based on one or more partition keys 232 calculated from metadata in messages and/or other records received over event streams 200. For example, partition keys 232 are calculated as hashes of user identifiers for users of a messaging platform and conversation identifiers for conversations conducted using the messaging platform. Ranges of values for partition keys 232 are additionally assigned to storage nodes 204 so that each storage node stores messages and/or other data associated with a certain subset of user identifiers and conversation identifiers. By distributing data among storage nodes 204 based on partition keys 232, the system ensures that each participant's copy of messages and related data grouped under a given conversation is stored on the same storage node. Conversely, the same partition keys 232 potentially cause multiple conversations involving the same participant and multiple copies of one conversation for multiple participants in the conversation to be distributed across multiple storage nodes 204.

Query-processing apparatus 202 processes searches 206 of messages, conversations, and/or other data in storage nodes 204. Searches 206 include terms 208 that are matched to data in storage nodes 204, as well as options 210 used to match terms 208 to different subsets of data in storage nodes 204. In one embodiment, terms 208 include tokens, words, and/or phrases to be found in metadata and/or message content stored in storage nodes 204. Options 210 include operators (e.g., AND, OR, NOT, grouping operators, exact match operators, etc.) that are applied to terms 208 and/or subsets of terms 208; filters (e.g., date ranges, participants, authors, labels, titles, etc.) associated with searches 206; and/or types of searches 206 (e.g., search within messages, search across messages in conversations, searching of message metadata, searching of conversation metadata, etc.) to be performed.

To process searches 206, query-processing apparatus 202 converts terms 208 and/or options 210 in searches 206 into queries 212 that can be executed on storage nodes 204. Query-processing apparatus 202 transmits queries 212 to the relevant storage nodes 204 and aggregates results 214 of queries 212 returned by storage nodes 204. Query-processing apparatus 204 optionally filters, merges, and/or formats results 214 before transmitting results 214 to components from which the corresponding searches 206 were received.

In an exemplary embodiment, one or more instances of query-processing apparatus 202 receive searches 206 of messages and/or conversations in a messaging platform after users submit searches 206 using a search module or feature of the messaging platform. Each instance includes a "query analyzer" that converts a search term and/or associated options 210 for a given search into an Apache Lucene (Lucene™ is a registered trademark of the Apache Software Foundation Inc.) query that can be executed using a Lucene index 236 on storage nodes 204. The instance also identifies and/or calculates one or more partition keys 232 associated with the search and perform a "fan-out" of the query to one or more storage nodes 204 to which the identified partition keys 232 are assigned. Each storage node that receives the query use a local copy of data store 234 and/or index 236 to process the query and return a subset of results 214 to the instance of query-processing apparatus 202 from which the query was received. After results 214 have been received from all storage nodes 204 to which the query was transmitted, the instance of query-processing apparatus 202 de-duplicates, sorts, and/or otherwise combines results 214 into a final set of results 214 and transmits the final set of results 214 for display within the search module or feature.

As mentioned above, storage nodes 204 include functionality to store and index conversations in a document structure (e.g., document structure 116 of FIG. 1) that reduces the consumption of storage resources and increases the efficiency and flexibility of executing searches 206 and/or queries 212 of data and metadata related to the conversations. Each conversation includes conversation metadata 216-218, message content 220-222, and message metadata (e.g., message metadata 1 224, message metadata m 226 for conversation 1 108, message metadata 1 228, message metadata n 230 for conversation y 110) that is stored in a number of documents in storage nodes 204.

In some embodiments, storage nodes 204 separate conversation metadata 216-218 for individual conversations and message metadata for messages in the conversations into separate documents. For example, a conversation with N messages is represented using one document containing a conversation identifier, title, list of participants, labels, and/or other conversation metadata attributes related to the conversation. A separate document is created for each of the N messages to store the message identifier, author, date/time of creation, conversation identifier, and/or other message metadata attributes related to the corresponding message. Thus, the document structure includes N+1 documents storing metadata related to the N messages grouped under the same conversations.

In some embodiments, storage nodes 204 store all message content exchanged within a given conversation in a single document, with fixed position gaps 240-242 separating message content for consecutive messages in the conversation. Continuing with the above example, message content for a conversation with N messages is stored in a single document on a single storage node, resulting in a total of N+2 documents for the conversation. Within the message content document, the virtual offset (e.g., a Lucene "startOffset" attribute) of a starting token in a given message is set to a value that is a fixed number of positions from the virtual offset of the starting token in the previous message. The number of positions separating virtual offsets of consecutive messages in the message content is additionally selected to be at least double the maximum message length for messages in the conversation.

Such organization and use of conversation metadata 216-218, message metadata, message content 220-222, and position gaps 240-242 within the document structure allows storage nodes 204 to create index 236 as an inverted index of documents in the document structure and process various types of queries 212 using index 236. First, the storing of all message content in a conversation within a single document that contains position gaps between consecutive messages allows searches 206 to be performed both within individual messages and across messages in the conversation.

In one embodiment, each storage node performs a search for one or more terms within individual messages in a conversation as a span query (e.g., a Lucene span query) with a distance that is shorter than the fixed position gap. Thus, the distance in the span query is set to 8,000 positions when individual messages with a maximum message length of 8,000 tokens are separated in the document with a position gap of 16,000 virtual offsets. Because message content for consecutive messages is separated by at least 8,000 virtual offsets in the document, the span query returns message content within individual messages that matches the term without matching the term to content that spans multiple messages.

Each storage node additionally performs a search for a term across messages in a conversation as a "custom" Lucene span query that matches tokens in the term to all occurrences of the tokens in the document containing message content for the conversation. An example of message content in a document includes the following:

M1: An apple is a sweet, edible fruit produced by an apple tree (*Malus pumila*)
M2: Apple trees are large if grown from seed
M3: The fruit matures in late summer or autumn, and cultivars exist with a wide range of sizes The message content above includes three messages denoted by "M1," "M2," an "M3." With a position gap of 16,000 virtual offsets between starting positions of consecutive messages in the document, message "M1" has a starting offset position of 0, message "M2" has a starting offset position of 16,000, and message "M3" has a starting offset position of 32,000. In one embodiment, the storage node on which the document resides additionally includes an in-memory mapping of the conversation's identifier and/or offsets of message content in the document to message identifiers of messages in the conversation.

When a search across messages in the conversation includes the tokens "apple," "grown," and "summer," a storage node identifies the following start and end positions of the tokens in the three messages as:

Start position=1, end position=2
Start position=10, end position=11
Start position=16000, end position=16001
Start position=16005, end position=16006
Start position=32005, end position=32006

The storage node uses the start and end positions and in-memory mappings from the positions to message identifiers in the conversation to generate results of the search that include message identifiers and/or some or all message content of messages containing the tokens.

Second, indexing of documents containing conversation metadata 216-218 and message metadata allows searching and/or filtering of conversations and messages by conversation titles, conversation participants, conversation labels, message authors, message timestamps, and/or other metadata attributes. For example, indexes of documents containing conversation metadata 216-218 for individual documents are used to perform searches for one or more conversations with the same title, participant, and/or label. In another example, indexes of documents containing message metadata for individual messages in conversations are used to retrieve messages that have certain authors, belong to certain conversations, and/or were transmitted within a certain time range.

To further reduce overhead associated with processing searches 206 and/or queries 212, storage nodes 204 include functionality to selectively index 236 documents based on usage and/or querying of the documents. For example, a storage node adds documents related to a user to index 236 and/or create a separate index 236 of the user's documents in memory after the user submits his/her first search for data on storage nodes 204. The storage node also removes documents related to the user from index 236 after a lack of search activity from the user over a pre-specified period (e.g., a number of days or weeks) and/or after the documents have been updated and/or deleted.

Storage nodes 204 additionally update the documents, data store 234, and/or index 236 based on events and/or records received over event streams 200. For example, storage nodes 204 append message content for new messages received over event streams 200 in one or more documents storing the message content. Storage nodes 204 also create a new document containing metadata for each new message. In turn, the new and/or modified documents are indexed (e.g., at query time) to generate results 214 of the corresponding queries. In another example, storage nodes 204 match a deleted message to conversations in which the message is found, delete the message content from documents containing message content for the conversations, and delete documents storing the message's metadata within the conversations.

By storing and indexing conversation metadata and message metadata for each message in a conversation in separate documents, the system of FIG. 2 allows conversation-specific metadata (e.g., title, participants, labels, etc.) and message-specific metadata (e.g., author, timestamp, etc.) to be separately searched and/or filtered. At the same time, the storing of all message content in the conversation with fixed position gaps in a single document allows for searching on both the message level and conversation level within a space-efficient layout.

On the other hand, conventional techniques store tokens in message content with identifiers of members, messages, and/or other attributes associated with the message content, which consumes significantly more storage than the document structure used by the system of FIG. 2. Executing searches of messages and/or conversations stored using conventional techniques additionally requires matching search terms to individual tokens and subsequently filtering the tokens by the corresponding identifiers, which may be slow and/or inefficient compared with searching of message content using position offsets within the same document. Consequently, the disclosed embodiments provide technological improvements related to the development and use of computer systems, applications, services, user experiences, tools, and/or workflows related to data storage, data indexing, search, and/or messaging.

Those skilled in the art will appreciate that the system of FIG. 2 may be implemented in a variety of ways. In an exemplary embodiment, storage nodes 204, query-processing apparatus 202, data store 234, and/or index 236 are provided by a single physical machine, multiple computer systems, one or more virtual machines, a grid, one or more clusters, one or more databases, one or more file systems, and/or a cloud computing system. The functionality of storage nodes 204 and query-processing apparatus 202 is additionally implemented together and/or separately by one or more hardware and/or software components and/or layers.

Those skilled in the art will also appreciate that the system of FIG. 2 may be adapted to other types of functionality. In one or more embodiments, operations related to the partitioning, indexing, storage, and/or querying of data by the system are adapted for use with groupings of resumes under jobs or candidates, e-commerce pages under products, and/or source code under repositories or projects.

Figure 3:
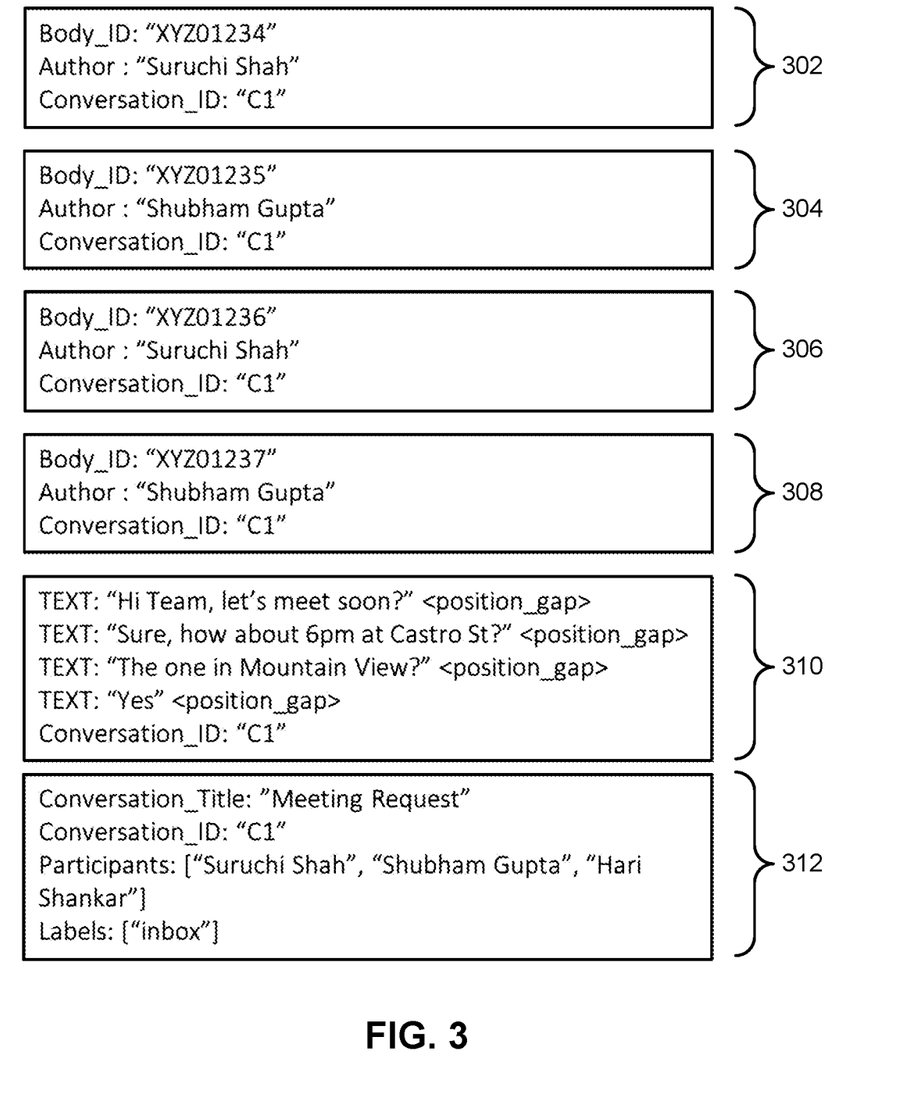
FIG. 3 shows an example set of documents in a document structure in accordance with the disclosed embodiments.

FIG. 3 shows an example set of documents 302-312 in a document structure in accordance with the disclosed embodiments. More specifically, FIG. 3 shows documents 302-312 arranged in the document structure used by storage nodes 204 of FIG. 2 to store, index, and/or search messages that are grouped under conversations.

As shown in FIG. 3, documents 302-308 include message metadata for four separate messages in a conversation, and document 312 includes conversation metadata for the conversation. Each of documents 302-308 includes a unique message identifier (i.e., "Body_ID") for the corresponding message, an "Author" of the message, and a conversation identifier (i.e., "Conversation_ID") of "C1" for the conversation. Document 312 includes a title of the conversation (i.e., "Converation_Title"), the same conversation identifier of "C1," a list of "Participants," and one or more "Labels" of "inbox."

Document 310 includes message content for the four messages that is separated by a fixed "position_gap" between starting positions of consecutive messages. Within document 310, the message content is stored in the same order as message metadata for the messages is stored in documents 302-308. Thus, content for the first message in document 310 maps to metadata in document 302, content for the second message in document 310 maps to metadata in document 304, content for the third message in document 310 maps to metadata in document 306, and content for the fourth message in document 310 maps to metadata in document 308. Document 310 also includes the same conversation identifier of "C1" as that of documents 302-308 and 312.

As discussed above, the document structure reflected in documents 302-312 is used to process different types of searches and/or queries. For example, a search that specifies an author of "Suruchi Shah" and tokens of "meet," "mountain," and "view" is matched to multiple messages in the conversation. The list of participants in document 312 is used to verify the user performing the search as one of the participants. An index of documents 302-312 is then used to identify "Suruchi Shah" as the author of the first and third messages in the conversation. A "custom" span query is then performed using the index to identify the presence of the tokens in the content of the first and third messages within document 310. In turn, the conversation identifier, message identifiers, message metadata, message content, and/or other attributes of the first and third messages are returned in results of the search.

Figure 4:
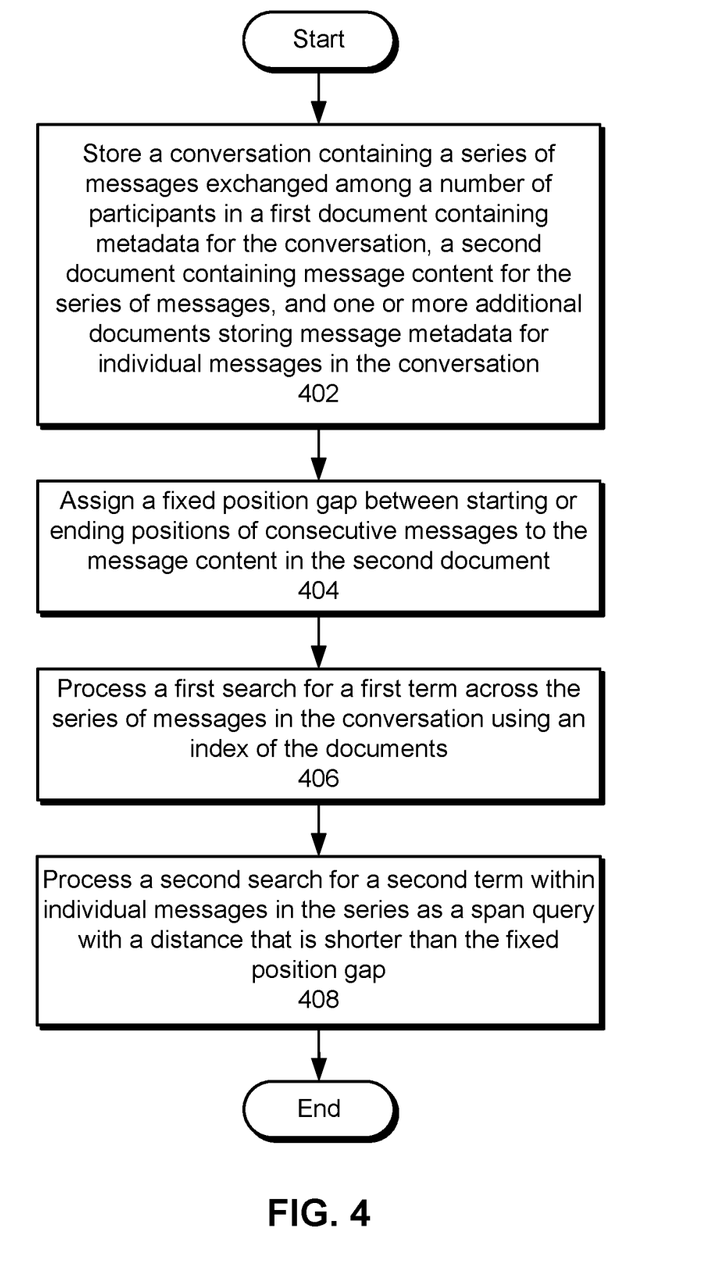
FIG. 4 shows a flowchart illustrating the processing of data in accordance with the disclosed embodiments.

FIG. 4 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a conversation containing a series of messages exchanged among a number of participants is stored in a first document containing metadata for the conversation, a second document containing message content for the series of messages, and one or more additional documents storing message metadata for individual messages in the conversation (operation 402). In some embodiments, a separate copy of the conversation is stored for each participant in conversation. In some embodiments, each copy of the conversation is stored on a storage node based on an identifier of the corresponding participant and/or the identifier for the conversation.

Next, a fixed position gap between starting or ending positions in consecutive messages is assigned to the message content in the second document (operation 404). For example, the fixed position gap includes a fixed number of virtual offsets between a first token at a start of one message in the series of messages and a second token at a start of the next message in the series of messages. The fixed position gap is selected to be at least double the maximum message length of the messages.

A first search for a first term across the series of messages in the conversation is processed using an index of the documents (operation 406). For example, the first search is performed by identifying start and end offset positions of tokens in the second document that match one or more portions (e.g., words or phrases) of the first term. The start and end positions are mapped to additional message content and/or message identifiers for the corresponding messages, and the message content and/or message identifiers are returned in a result of the first search.

A second search for a second term within individual messages in the series is processed as a span query with a distance that is shorter than the fixed position gap (operation 408) between consecutive messages in the second document. For example, the span query is performed with a distance that is greater than or equal to the maximum message length for the messages and less than or equal to half the fixed position gap. Because the distance provides coverage of message content in individual messages without extending past the fixed position gap placed between messages in the second document, results returned by the span query include message content matching the second term within individual messages.

Figure 5:
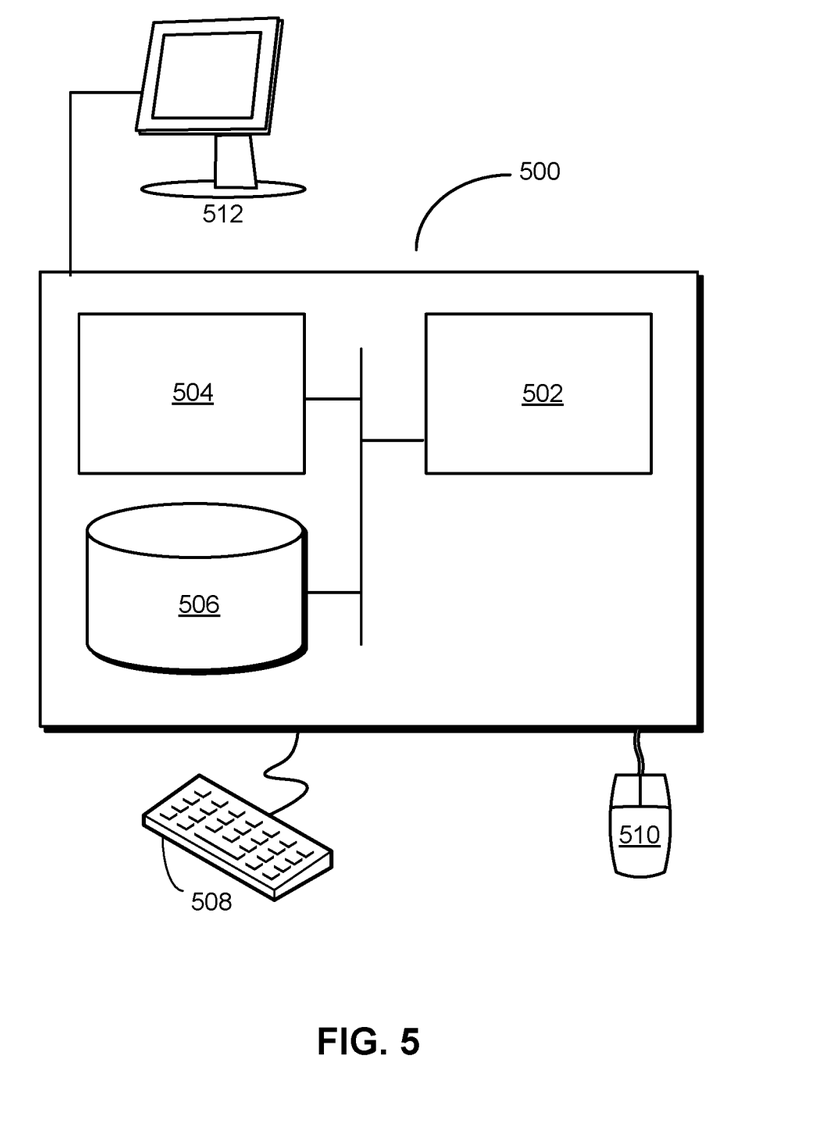
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing data. The system includes a query-processing apparatus and a number of storage nodes, one or more of which are alternatively termed or implemented as a module, mechanism, or other type of system component. The storage nodes store a conversation containing a series of messages exchanged among a number of participants in a first document containing metadata for the conversation; a second document containing message content that includes a fixed position gap between consecutive messages in the series of messages; and one or more additional documents storing message metadata for individual messages in the conversation. Next, the query-processing apparatus and storage nodes process a first search across the series of messages in the conversation using an index of the set of documents. The query-processing apparatus and storage nodes also process, using the index, a second search within individual messages in the series of messages as a span query with a distance that is shorter than the fixed position gap.

In addition, one or more components of computer system 500 may be remotely located and connected to the other components over a network. Portions of the present embodiments (e.g., query-processing apparatus, storage nodes, data store, index, event streams, etc.) may also be located on different nodes of a distributed system that implements the embodiments. For example, the present embodiments may be implemented using a cloud computing system that searches within and/or across messages in conversations involving a set of remote users.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor (including a dedicated or shared processor core) that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A system, comprising:
   one or more processors; and
   memory storing instructions that, when executed by the one or more processors, cause the system to:
   store a conversation comprising a series of messages exchanged among a number of participants in a set of documents, wherein the set of documents comprises:
   a first document comprising metadata for the conversation;
   a second document comprising message content for the series of messages, wherein each message in the series of messages is stored in the second document with a fixed position gap between individual messages, the fixed position gap having a length that is twice the length of a predetermined maximum message length; and
   one or more additional documents, wherein each of the one or more additional documents stores message metadata for an individual message in the series of messages;
   process a first search for a first term across the series of messages in the conversation using an index of the set of documents; and
   process, using the index, a second search for a second term within individual messages in the series of messages as a span query with a distance that is greater than or equal to the predetermined maximum message length for each message in the series of messages and less than or equal to half the length of the fixed position gap.

2. The system of claim 1, wherein the fixed position gap comprises a number of virtual offsets between a first token at a start of a first message in the series of messages and a second token at a start of a second message following the first message in the series of messages.

3. The system of claim 1, wherein storing the representation of the conversation comprises:
   storing a first copy of the set of documents on a first storage node associated with a first identifier for a first participant in the conversation; and
   storing a second copy of the set of documents on a second storage node associated with a second identifier for a second participant in the conversation.

4. The system of claim 3, wherein storing the representation of the conversation further comprises;
   storing the first and second copies of the set of documents on the first and second storage nodes based on a third identifier for the conversation.

5. The system of claim 1, wherein processing the first search for the first term across the series of messages in the conversation using the index of the set of documents comprises:
   identifying start and end positions of tokens in the second document that match the first term.

6. The system of claim 1, wherein processing the first search for the first term across the series of messages in the conversation using the index of the set of documents comprises:
   generating, on the first storage node, the index from the set of documents upon receiving the first search from one of the participants.

7. The system of claim 1, wherein the metadata for the conversation comprises at least one of:
   a title;
   a conversation identifier;
   a list of the participants; and
   one or more labels.

8. The system of claim 1, wherein the message metadata comprises at least one of:
   a message identifier;
   a conversation identifier;
   an author; and
   a time of creation.

9. A method, comprising:
   storing, by one or more computer systems, a conversation comprising a series of messages exchanged among a number of participants in a set of documents, wherein the set of documents comprises:
   a first document comprising metadata for the conversation;
   a second document comprising message content for the series of messages, wherein each message in the series of messages is stored in the second document with a fixed position gap between individual messages, the fixed position gap having a length that is twice the length of a predetermined maximum message length; and
   one or more additional documents, wherein each of the one or more additional documents stores message metadata for an individual message in the series of messages;
   processing, by the one or more computer systems, a first search for a first term across the series of messages in the conversation using an index of the set of documents; and
   process, using the index, a second search for a second term within individual messages in the series of messages as a span query with a distance that is greater than or equal to the predetermined maximum message length for each message in the series of messages and less than or equal to half the length of the fixed position gap.

10. The method of claim 9, wherein the fixed position gap comprises a number of virtual off sets between a first token at a start of a first message in the series of messages and a second token at a start of a second message following the first message in the series of messages.

11. The method of claim 9, wherein storing the representation of the conversation comprises:

storing a first copy of the set of documents on a first storage node associated with a first identifier for a first participant in the conversation.

12. The method of claim 11, wherein storing the representation of the conversation further comprises:

storing a second copy of the set of documents on a second storage node associated with a second identifier for a second participant in the conversation.

13. The method of claim 12, wherein storing the representation of the conversation further comprises;

storing the first and second copies of the set of documents on the first and second storage nodes based on a third identifier for the conversation.

14. The method of claim 9 wherein processing the first search for the first term across the series of messages in the conversation using the index of the set of documents comprises:

generating, on the first storage node, the index from the set of documents upon receiving the first search.

15. A non-transitory computer-readable storage medium storing instructions that when executed by a computer cause the computer to perform a method, the method comprising:

storing a conversation comprising a series of messages exchanged among a number of participants in a set of documents, wherein the set of documents comprises:

a first document comprising metadata for the conversation;

a second document comprising message content for the series of messages, wherein each message in the series of messages is stored in the second document with a fixed position gap between individual messages, the fixed position gap having a length that is twice the length of a predetermined maximum message length;

one or more additional documents, wherein each of the one or more additional documents stores message metadata for an individual message in the series of messages;

processing a first search across the series of messages in the conversation using an index of the set of documents; and processing, using the index, a second search within individual messages in the series of messages as a span query with a distance that is greater than or equal to the predetermined maximum message length for each message in the series of messages and less than or equal to half the length of the fixed position gap.

* * * * *